United States Patent [19]
Ricketts

[11] Patent Number: 4,986,794
[45] Date of Patent: Jan. 22, 1991

[54] ROTOR ASSEMBLY FOR AN AXIAL-FLOW COMBINE

[75] Inventor: Jonathan E. Ricketts, Viola, Ill.

[73] Assignee: J. I. Case Company, Racine, Wis.

[21] Appl. No.: 503,748

[22] Filed: Apr. 3, 1990

[51] Int. Cl.$^5$ .......................... A01F 7/06; A01F 12/18; A01F 12/20

[52] U.S. Cl. ........................................ 460/67; 460/68; 460/69; 460/70; 460/71

[58] Field of Search ...................... 460/66, 67, 68, 69, 460/70, 71, 16, 80

[56] References Cited

U.S. PATENT DOCUMENTS

| | | | |
|---|---|---|---|
| 3,572,346 | 3/1971 | Knapp et al. | 460/68 |
| 3,827,443 | 8/1974 | Drayer | 460/16 |
| 3,863,643 | 2/1975 | DePauw | 460/66 |
| 3,964,492 | 6/1976 | Crego et al. | 460/68 |
| 3,982,549 | 9/1976 | DePauw et al. | 460/67 |
| 4,075,823 | 2/1978 | Rowland-Hill | 460/66 X |
| 4,177,821 | 12/1979 | Peiler et al. | 460/70 |
| 4,178,943 | 12/1979 | West | 460/80 |
| 4,291,709 | 9/1981 | Weber et al. | 460/60 |
| 4,505,279 | 3/1985 | Campbell et al. | 460/66 |

Primary Examiner—Stephen J. Novosad
Attorney, Agent, or Firm—Dressler, Goldsmith, Shore, Sutker & Milnamow, Ltd.

[57] ABSTRACT

An axial-flow combine with an improved rotor assembly which is configured to be less sensitive to crop material conditions. The rotor assembly includes a rotor casing with a rotor rotatably arranged therewithin. At its forward end, the rotor casing is provided with a transition section having a forward crop receiving end and an aft end. The rotor is provided with an impeller section which leads in a downstream direction to a threshing section. The impeller section of the rotor includes a plurality of impeller blades arranged within the transition section of the rotor assembly. A rearward end of each blade terminates upstream of the aft end of the transition section whereby allowing threshing instrumentalities on the threshing section of the rotor to extend into the transition section thereby extending the threshing area of the rotor thus enhancing crop material flow through the rotor assembly.

3 Claims, 2 Drawing Sheets

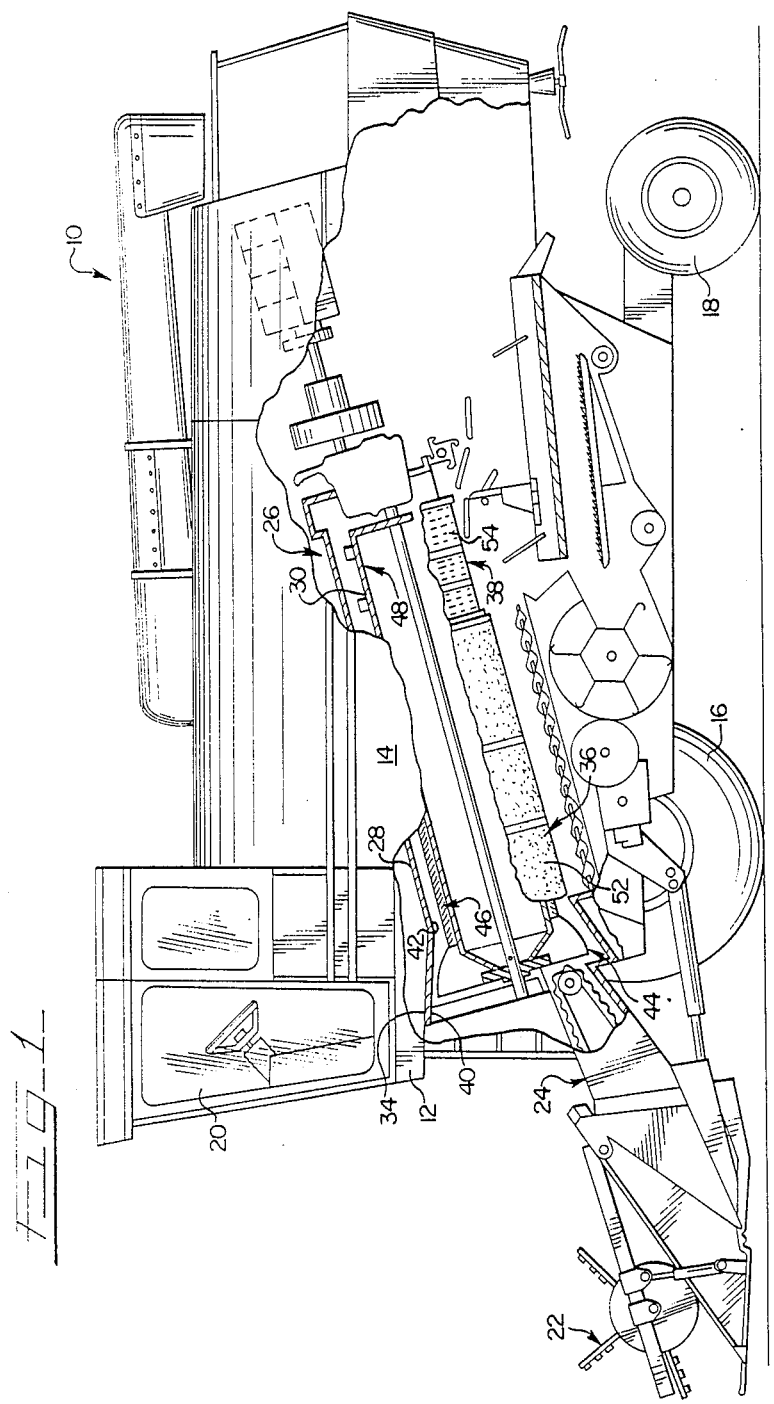

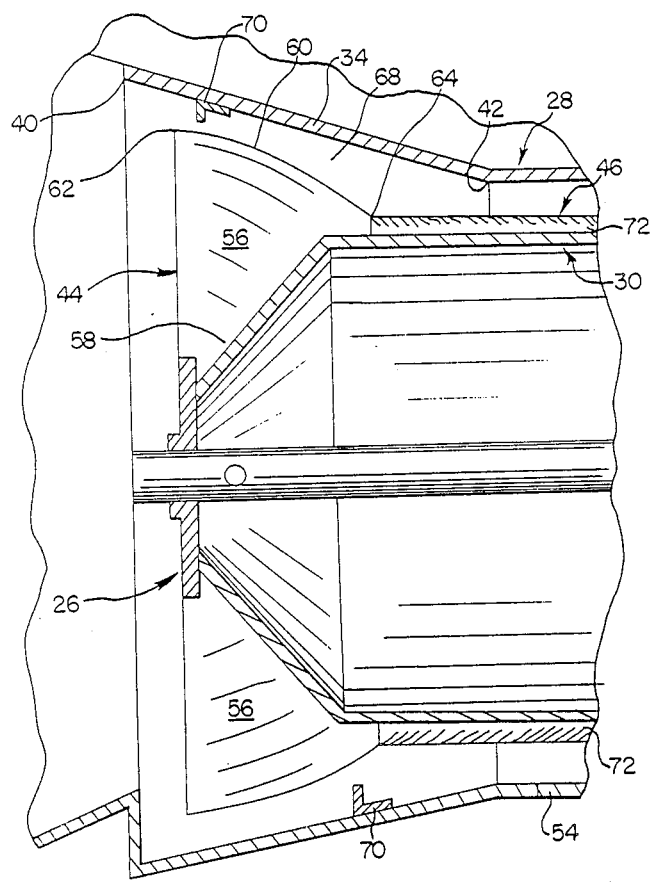

ROTOR ASSEMBLY FOR AN AXIAL-FLOW COMBINE

FIELD OF THE INVENTION

The present invention generally relates to axial-flow combines and, more particularly, to an improved rotor assembly with a crop intake area configured to inhibit excessive buildup and clogging of crop material moving therethrough.

BACKGROUND OF THE INVENTION

A combine having an axial-flow rotor assembly is well-known in the art. The rotor assembly of such combines includes a driven rotor which is rotatably and concentrically arranged within a rotor casing. Crop material is fed into a crop receiving forward end of the rotor assembly. A vaned impeller at the forward end of the rotor moves the crop material rearwardly toward a threshing area of the rotor assembly. In the threshing area, the crop material is carried around the rotor by rasp bars which comb the crop material into an annular mat. From the threshing area, the mat of crop material is rearwardly moved to a separating area of the rotor assembly where it is further processed by cooperative instrumentalities on the rotor and rotor casing.

To facilitate the receipt and transfer of crop material through the rotor assembly, a forward end of the rotor casing is provided with a frusto-conically shaped transition section. The vaned impeller at the forward end of the rotor is arranged within the transition section of the rotor casing and includes a series of impeller blades which radially extend outward from the rotor and are provided with a working edge arranged close to the transition section on the rotor casing. The working edge on the blades typically extends from near a forward end to a rearward end of the transition section and in combination therewith defines a narrow annular opening through which the crop material is advanced toward the rasp bars on the rotor.

The impeller blades on the rotor primarily move the crop material rearwardly in a spiral fashion toward the threshing area of the rotor assembly and have minimal effect on combing the crop material into a mat. There is a tendency, therefore, for the crop material to collect into "ropes" or fold into wads as it advances toward the threshing area. The tendency for crop material to collect into a "rope" or fold into a wad is especially pronounced in handling the more difficult crop materials, particularly long straw varieties at high moisture contents and especially rice.

At the rear end of the transition housing, the crop material is presented to a radially extending front face of the rasp bars which tend to cause a "back-feed" problem in the rotor assembly. The "ropes" or folded wads of crop material accentuate the problem by tending to jam or wedge between the rotor and the rotor cage. Such jamming or wedging of the crop material between the rotor and the rotor cage is noisy and can cause serious torque fluctuations in a drive system for the rotor. Occasionally, such jamming will actually prevent the rotor from rotating and may cause serious damage to the drive system. Moreover, such "ropes" or folded wads reduce the threshing and separating efficiency of the rotor assembly due to the undesirable bunching of the crop material.

SUMMARY OF THE INVENTION

In view of the above, and in accordance with the present invention, there is provided an axial-flow combine with an improved rotor assembly which is configured at its forward end to be less sensitive to crop material conditions. The rotor assembly is comprised of an elongated generally cylindrical rotor casing and a rotor mounted in the rotor casing about an axis of rotation. A forward end of the rotor has been modified to improve its threshing ability and thereby facilitate crop material flow through the rotor assembly.

The rotor casing of the rotor assembly extends in a fore-and-aft direction on the combine. The rotor casing defines a forward threshing region and a rearward separating region. A frusto-conically shaped transition section, which is designed for endwise reception of crop materials, extends forwardly from the threshing region of the rotor casing. In the illustrated embodiment, the transition section is configured with a decreasing cross-sectional area in a downstream direction. The transition section extends from a crop intake or forward end to an aft end which is joined to the generally cylindrical threshing region on the rotor casing.

The rotor includes an impeller section which leads in a downstream direction to threshing and separating sections, respectively. The impeller section is defined by a plurality of blades arranged within the transition section on the rotor casing and which are adapted to draw air and crop material into the crop intake or forward end of the transition section.

Each impeller blade has an outwardly disposed working edge with a declining slope extending between leading and trailing ends on the blade. The working edge of the blades creates, in cooperation with the transition section of the rotor casing, an annular opening through which the crop material is moved toward the threshing section of the rotor. The trailing end of each blade terminates upstream of the aft end of the transition section of the rotor casing such that the annular opening through which crop material is moved increases rearwardly of the trailing end of each blade.

The threshing section on the rotor includes a plurality of peripherally arranged rasp bars which combine with the threshing region on the rotor casing to comb and rearwardly propel the crop material presented thereto by the impeller blades. A forward end of each rasp bar extends into the transition section of the rotor casing. The crop material moved rearwardly by the impeller blades is fed onto the top of the rasp bars extending into the transition section so as to allow a threshing action to begin on the crop material while in the transition section of the rotor casing. Extending the threshing action of the rotor into the transition section of the rotor casing facilitates combing the crop material into a thin annular mat thereby allowing a more even feed into the remaining threshing area, thus facilitating crop material flow rearwardly through the rotor assembly. The enhanced ability to comb the crop material into an even mat furthermore provides a more efficient threshing and separating action as the material rearwardly flows toward the aft end of the rotor assembly.

In the preferred embodiment, each impeller blade has an inner edge extending between its leading and trailing ends. The inner edge slopes in a direction opposed to the declining slope of the working edge on each blade. Moreover, a leading portion of the inner edge of each blade is disposed radially inward of a trailing portion of the inner edge of the respective blade.

The increase in size of the annular opening extending rearwardly from the rear end of each blade enhances the ability to continually move crop materials, which tend to collect into a "rope" or a folded wad through the rotor assembly. By feeding the crop material onto the top of the rasp bars, back-feed problems in the rotor assembly are reduced while promoting a more even and distributed feeding of crop material into the threshing area of the rotor assembly. When compared with other axial-flow designs, the present invention increases the threshing area by extending the rasp bars into the transition section of the rotor casing. As will be appreciated, increasing the threshing area enhances the ability to separate the grain from material other than grain as the crop material is advanced through the rotor assembly. Moreover, extending the threshing area also improves the ability to comb the crop material into a relatively thin annular mat which results in less friction between the threshing instrumentalities and the crop material and, thereby lowers specific power consumption which is particularly advantageous when harvesting crops at high moisture content.

Numerous other advantages and features of the present invention will become apparent from the following detailed description, the accompanying drawings and the appended claims.

BRIEF DESCRIPTION OF THE DRAWINGS

FIG. 1 is a side elevational view of an axial-flow combine embodying the principles of the present invention and wherein a major portion of one side wall of the combine is removed to illustrate internal features of a rotor assembly used in combination with the combine; and FIG. 2 is an enlarged fragmentary side view of a front end portion of the rotor assembly.

DETAILED DESCRIPTION OF THE PRESENT INVENTION

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Referring now to the drawings, wherein like reference numerals indicate like parts throughout both views, there is shown an axial-flow-type self-propelled combine which is designated in its entirety by the reference numeral 10. The combine is of the general type shown and described in U.S. Pat. No. 3,481,342, granted on Dec. 2, 1969, and entitled "Axial-Flow-Type Combine."

The illustrated embodiment of the combine 10 includes a frame 12 with vertical side walls 14 supported by a pair of laterally spaced forward drive wheels 16 and a pair of steerable rear wheels 18. The combine 10 further includes an operator's station and cab 20, a crop-gathering header assembly 22 and a crop feeder assembly 24. An axial-flow rotor assembly 26 is supported by and extends in a fore-and-aft direction on the frame 12.

The rotor assembly 26 is comprised of a stationary elongated and generally cylindrical rotor casing 28 and a rotor 30 mounted in the rotor casing 28 about an axis of rotation. The rotor 30 is driven by an engine (not shown) which also provides power for propelling the combine and driving its components. Apart from the rotor assembly 26, other components of the combine are generally conventional and are not described in detail herein.

The stationary rotor casing 28 includes a transition section 34 which leads in a downstream direction to a generally cylindrical threshing region 36 and a generally cylindrical separating region 38, respectively. The transition section 34 is configured with a frusto-conical shape and is designed for endwise reception of crop material from the crop feeder assembly 24. The transition section 34 defines a crop-receiving forward end 40 and an aft end 42 which is joined to the generally cylindrical threshing region 36. As illustrated, the transition section 34 has a decreasing cross-sectional area in a downstream direction extending between the forward and aft ends thereof. In the illustrated embodiment, the transition section 34 may be regarded as a forward extension of the threshing region 36 and its conical characteristics are such that it has a slant angle ranging between 15 and 20 degrees relative to the rotational axis of the rotor 30.

The rotor 30 includes an impeller section 44, a threshing section 46 and a separating section 48. The impeller section 44 is arranged within and cooperates with transition section 34 of the rotor casing 28 in moving crop material rearwardly through the rotor assembly. The threshing section 46 on the rotor 30 combines with the threshing region 36 on the rotor casing 23 to define a threshing area on the rotor assembly wherein crop material is processed as it travels rearwardly through the rotor assembly. Grain threshed from the crop material in the threshing area escapes from the rotor casing 28 through one or more concaves 52. The separating section 48 on the rotor 30 cooperates with the separating region 38 on the rotor casing 28 to define a separating area wherein crop material is further processed as it travels rearwardly. Straw and other waste material is discharged toward the rear end of the rotor assembly, while grain separated from the crop material in the separating area of the rotor assembly escapes from the rotor casing 28 through grates 54 provided in the separating region 38 of the rotor casing.

Referring particularly to FIG. 2, the transition section 34 of the rotor casing 28 and the forward end of the rotor 30 constitute one of the salient features of the present invention. The impeller section 44 of the rotor 30 includes a plurality of circumferentially equally spaced blades or helix flights 56. Each blade 56 is rigidly secured to a mounting surface on the rotor along an inner edge 58. Each blade 56 has an outward working edge 60 radially disposed from its inner edge 58 and extending with a declining slope between a leading or forward end 62 and a rearward or trailing end 64. Notably, the trailing end 64 of the working edge of each blade 56 is generally to coincide with or is disposed radially outward from the diameter of the generally cylindrical threshing section 46 arranged adjacent thereto.

Between the inner edge 58 and the working edge 60, each blade has a somewhat twisted form configured to draw air and crop material into the transition section 34 and move it toward the rearward end of the rotor assembly. As illustrated, the inner edge 58 of each blade slopes in a direction opposed to the declining slope of the working edge 60. Moreover, a forward or leading portion of the inner edge 58 is disposed radially inward of a rearward or trailing portion of the inner edge 58 of each blade 56.

As illustrated in FIG. 2, the trace developed by the working edge 60 of each blade creates, in cooperation with an internal wall surface of the transition section 34 of the rotor casing 28, an annular opening or space 68 through which crop material is moved rearwardly toward the threshing area on the rotor assembly. A plurality of spiral transport fins 70 supported on an internal wall surface of the transition section 34 extend into the annular opening or space 68 to facilitate rearward movement of the crop material through transition section of the rotor assembly.

The threshing section 46 on the rotor 30 includes threshing instrumentalities which combine with the rotor assembly to comb the crop material into an annular mat. In the illustrated embodiment, such threshing instrumentalities include a series of rasp bars 72. The rasp bars 72 longitudinally extend along and are secured to an outer surface of rotor 30. When the rotor 30 turns, the threshing instrumentalities or rasp bars cooperate with the concaves 54 on the rotor housing 28 to thresh or process the crop material in the usual manner.

As illustrated in FIG. 2, the trailing end 64 of each blade 56 terminates upstream of the aft end 42 of the transition section 34 of rotor casing 28. By terminating each blade 56 upstream of the aft end of the transition section, and with the trailing end 64 of the working edge 60 of the blade 56 disposed radially outward from the diameter of the threshing section 46 on the rotor 30, there is an increase in the annular opening 68 in the area rearward of the trailing end 64 of each blade 56. Moreover, a forward end of each rasp bar 72 extends upstream of the aft end 42 and into the transition section of the rotor casing 28. In the illustrated embodiment, a forward end of the rasp bars 72 is immediately adjacent the trailing end 64 of each impeller blade 56.

During operation, the header assembly 22 gathers crop material as the combine 10 advances over a field and delivers crop material to the crop feeder assembly 24. The crop material is conveyed by way of the feeder assembly 24 to the crop intake or forward end of the transition section 34 of the rotor casing 28. The impeller blades 56 on the rotor 30 thereafter spirally convey the crop material rearwardly in the annular space 68 between the working edge 60 on the impeller blades and an inner surface on the transition section 34.

The present invention offers many advantageous features which enhance crop material flow through the axial-flow combine. First, the annular opening 68 between the impeller blades 56 and the transition section 34 becomes larger rearwardly of the trailing end of the blades. The increase in the size of the opening 68 facilitates the ability to move crop materials which tend to collect into a "rope" or folded wad through the rotor assembly. Second, by extending the rasp bars 72 into the transition section 34 of the rotor casing 28, the threshing area of the rotor assembly 28 is extended such that a threshing action on the crop material begins in the transition section of the transition housing.

By terminating the impeller blades 56 upstream of the aft end 42 in the transition section 34, crop material is fed onto the top of the extended length of the rasp bars 72 to facilitate combing the crop material into a thin annular mat which then allows a more even feed of the crop material into the main threshing area of the rotor assembly 28. The ability to comb the material into a thin annular mat facilitates the rubbing action between the rasp bars 72 and the concaves 54 so as to more effectively separate the grain from the chaff. As will be understood, the ability to comb the material into a thin annular mat furthermore facilitates the separation process toward a rear end of the combine.

From the foregoing, it will be observed that numerous modifications and variations can be effected without departing from the true spirit and scope of the novel concept of the present invention. It will be appreciated that the present disclosure is intended to set forth an exemplification of the invention which is not intended to limit the invention to the specific embodiments illustrated. The disclosure is intended to cover by the appended claims all such modifications as fall within the scope of the claims.

What is claimed is:

1. An improved rotor assembly for an axial-flow combine comprising:
    an elongated generally cylindrical rotor casing extending in a fore-and-aft direction on the combine, said rotor casing defining a frusto-conically shaped transition section designed for endwise reception of crop material and configured with a decreasing cross-sectional area in a downstream direction extending from a forward end to an aft end, with the aft end of said transition section leading to a threshing region and a separating region defined by said rotor casing; and
    a rotor mounted for rotation in the rotor casing about an axis of rotation, said rotor including an impeller section which leads in a downstream direction to a threshing section, said impeller section being defined by a plurality of impeller blades arranged within the transition section of said rotor casing and with each impeller blade having a working edge with a declining slope extending between leading and trailing ends on each blade to create in cooperation with the transition section on the rotor casing an annular opening through which crop material moves toward the threshing section and wherein the trailing end of each impeller blade terminates upstream of the aft end of the transition section such that the annular opening through which crop material moves increases rearwardly of the trailing ends of the impeller blades, said threshing section of said rotor including a plurality of peripherally arranged rasp bars for combing and rearwardly propelling the crop material presented thereto by the impeller blades, a forward end of each rasp bar extending upstream of the aft end of the transition section on the rotor casing and adjacent to the trailing end portion of the impeller blades to begin a threshing action on the crop material in the transition section of the rotor casing and thereby facilitating crop material flow rearwardly through the rotor assembly.

2. The improved rotor assembly according to claim 1 wherein each impeller blade has an inner edge extending between the respective leading and trailing end portions, said inner edge sloping in a direction opposed to the declining slope of said working edge.

3. The improved rotor assembly according to claim 2 wherein a leading portion of the inner edge of each blade is disposed radially inward of a trailing portion of the respective inner edge of the respective blade.

* * * * *